Aug. 5, 1924.

T. LUND 1,503,542

MACHINE FOR FEEDING AND DELIVERING TOP LIFTS

Filed Aug. 4, 1919   2 Sheets-Sheet 2

INVENTOR
Thomas Lund
By his Attorneys

Patented Aug. 5, 1924.

1,503,542

UNITED STATES PATENT OFFICE.

THOMAS LUND, OF BEVERLY, MASSACHUSETTS, ASSIGNOR TO UNITED SHOE MACHINERY CORPORATION, OF PATERSON, NEW JERSEY, A CORPORATION OF NEW JERSEY.

MACHINE FOR FEEDING AND DELIVERING TOP LIFTS.

Application filed August 4, 1919. Serial No. 315,168.

*To all whom it may concern:*

Be it known that I, THOMAS LUND, a citizen of the United States, residing at Beverly, in the county of Essex and State of Massachusetts, have invented certain Improvements in Machines for Feeding and Delivering Top Lifts, of which the following description, in connection with the accompanying drawings, is a specification, like reference characters on the drawings indicating like parts in the several figures.

This invention relates to means for facilitating the furnishing of articles such as toplifts to customers or dealers in accurately determined quantities.

Heretofore it has been customary to count toplifts and cut soles by hand prior to packaging the same, the articles being taken from a mass as from a barrel.

The particular object of my invention is to provide a machine to which the toplifts may be promiscuously furnished in large quantities and from which they will issue into a suitable receptacle, which machine will accurately register the number of toplifts passing from the machine to such receptacle.

To this end, an important feature of the invention comprises devices which positively feed toplifts singly, with means for registering the passage of each toplift, and means for separating the toplifts from a mass or quantity and transferring them individually to the feeding means.

Another feature of the invention consists in the provision of a guide or trough so shaped as to receive toplifts in an edgewise or other predetermined position only with means for automatically depositing toplifts in the trough, the trough preferably having a travelling floor, and a counter being located to be actuated by each toplift issuing from the trough.

The above and other features of the invention will be clearly understood from the following description in conection with the accompanying drawings in which, Fig. 1 is a side elevation, partly broken out, of a machine embodying my improvements;

Figures 3, 4:
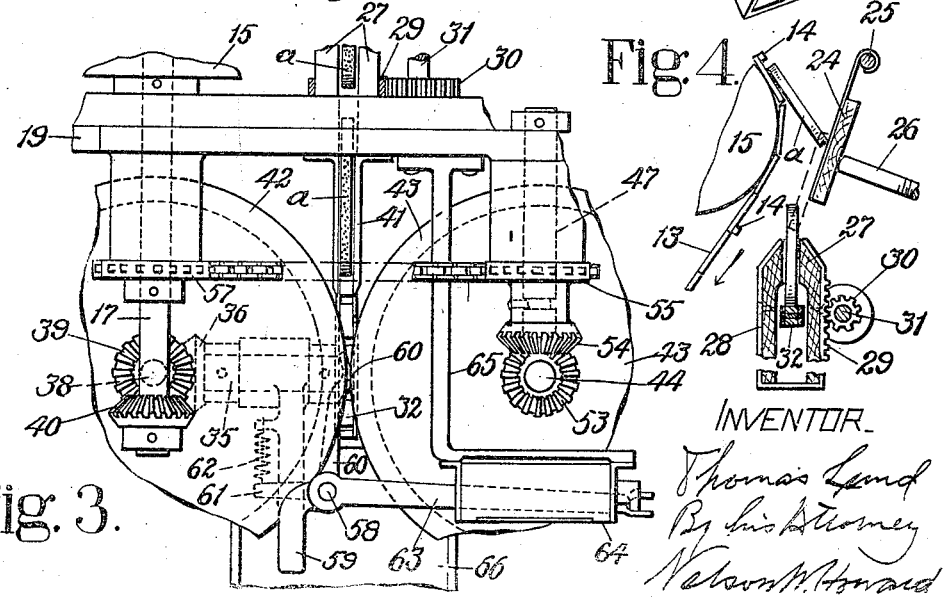
Fig. 3 is a plan view, partly broken away, of the mechanism shown at the top of Fig. 1.
Fig. 4 is a detail sectional view of the toplift receiving trough and the means for delivering toplifts thereto.

A suitably constructed hopper 12, preferably having a capacity to receive the contents of a barrelful of toplifts which may be dumped in a promiscuous mass therein, receives the lower portion of a lift separating and elevating conveyor 13 having transverse ribs 14 which, as shown in Fig. 4, are not greater in height than the thickness of a single lift, said conveyor being mounted on upper and lower drums 15, 16, respectively. The shaft 17 of the upper drum is provided with a pulley 18 by means of which said shaft and the entire machine may be power driven as by a belt engaging said pulley. A bracket casting 19 is secured to the side of the upper portion of the hopper as by bolts 20, said bracket supporting most of the mechanism hereinafter described.

Suitable bearings 21 for the shaft of the lower drum 16 are mounted in slotted brackets 22, adjusting screws 23 acting upon said bearings being provided for keeping the elevating conveyor under proper tension.

Figure 2:
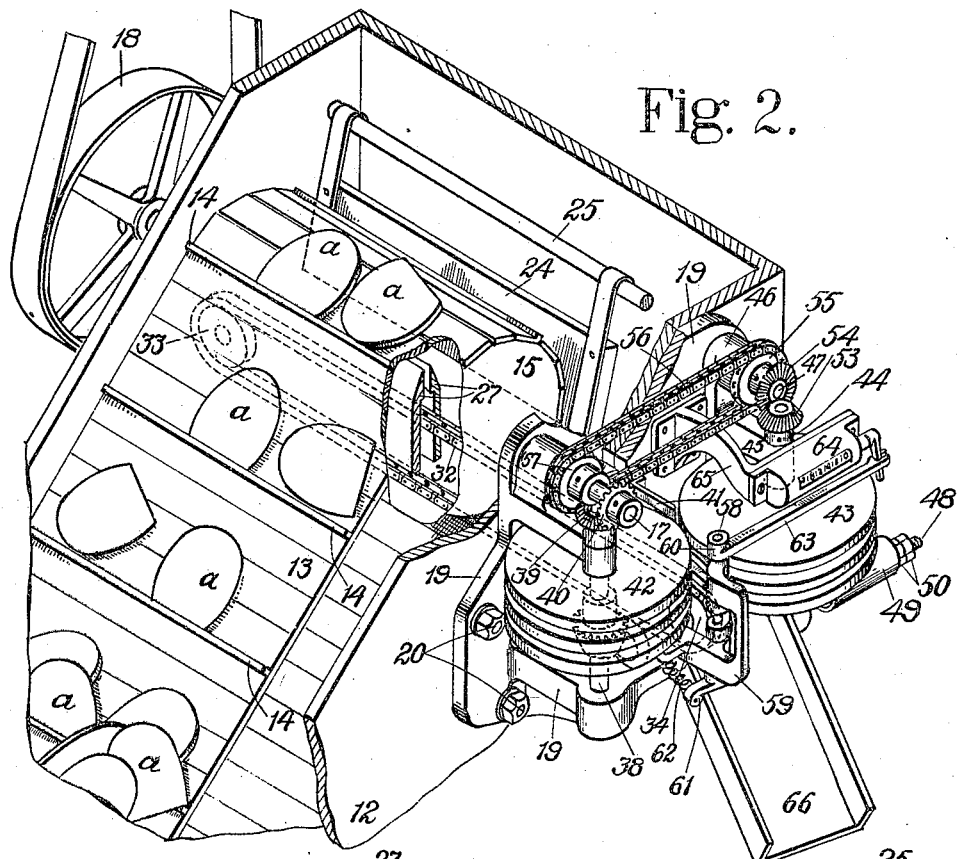
Fig. 2 is a perspective partially broken out view of the principal portions of the machine.

Rotation of the shaft 17 in the proper direction causes toplifts *a, a* to be engaged by the ribs 14 as indicated in Fig. 2, said toplifts being separated from the mass in the hopper 12 and elevated until they pass over the upper drum and slide edgewise off from the conveyor as indicated in Fig. 4 into a feeding mechanism comprising an adjustable receiving trough having a moving floor or bottom. To properly direct the toplifts toward the receiving trough presently described, I employ a deflector 24 pivotally supported on a rod 25 and adjustable as to its degree of inclination by one or more suitable screws 26. From the deflector the toplifts drop into a receiving trough comprising side members 27 which are held in suitably spaced relationship by straps 28 portions of which are provided with rack teeth 29 engaged by pinions 30 carried by a manually rotatable shaft 31, said trough being fitted to suitable guideways so that, by means of the shaft 31 and its pinions, and the rack teeth 29, the trough may be adjusted to the proper height to receive toplifts dropping edgewise thereinto. Ordinarily toplifts do not vary greatly in thickness and those of a given thickness are in barrels prior to counting. If the toplifts to be counted are quite thick it is desirable to adjust the receiving trough to a somewhat higher position than when the toplifts are of a thinner grade so that the articles will be accurately supplied to the opening between the two members 27 of the trough. As illustrated in Fig. 4 the upper portion of the trough is beveled or inclined in opposite directions so that if it should happen that toplifts arrive in position to enter the trough before preceding toplifts have been taken therefrom by the means presently described, the excess or surplus toplifts may be directed into any suitable catch receptacle to be afterward returned to the hopper for counting.

To remove the toplifts from the trough as fast as they are deposited therein, I provide a chain conveyor 32 mounted on sprockets 33, 34 (Fig. 2), the upper run of said chain conveyor forming a continuously delivering floor of the trough to carry the toplifts toward the feeding and counting mechanism.

Figure 1:
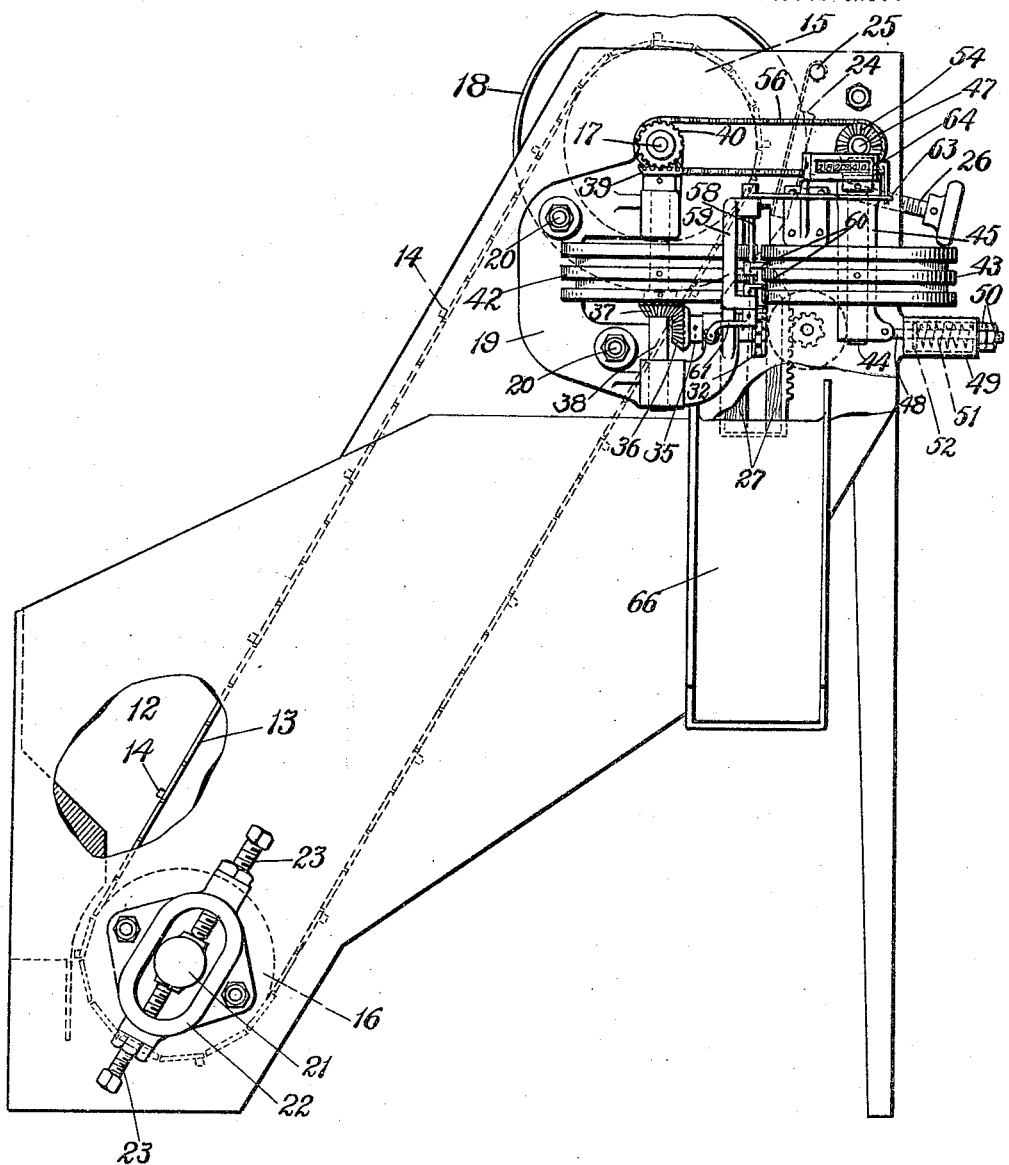

To actuate the chain conveyor the outer sprocket 34 thereof is carried by a shaft 35 (Fig. 3) operatively connected through bevel gearing 36, 37 (Fig. 1) with a vertical shaft 38 mounted in bearings carried by the bracket 19. The upper end of the shaft 38 is connected by bevel gearing 39, 40 with the main drive shaft 17.

As the toplifts issue through the wall of the hopper under the influence of the chain conveyor, they pass through a suitable nozzle 41 (Figs. 2 and 3) so as to be engaged by the two feed wheels 42, 43 which are preferably grooved for a purpose hereinafter described. The feed wheel 42 is carried by the vertical shaft 38 and consequently is actuated thereby. I will now describe the means for correspondingly actuating the other feed wheel 43 which is preferably mounted to yield slightly relatively to the feed wheel 42 to enable the two feed wheels to frictionally grasp and eject toplifts of varying thicknesses.

The shaft 44 of feed wheel 43 is mounted in bearings 45 (Fig. 2) projecting from a downwardly extending arm which has a hub 46 pivotally mounted on a stud or pin 47 projecting from bracket 19. The lower end of this pivoted arm which carries the bearings for wheel 43 is connected to the rod 48 (Fig. 1) said rod passing through a cup or cylinder 49 and having set nuts 50 on its threaded outer end. A spring 51 in the cylinder and confined between the outer end thereof and a collar 52 secured to the rod 48 acts to yieldingly press the wheel 43 toward the wheel 42 so that the wheel 43 can yield as toplifts pass between the two wheels. The yielding movement is slight, of course, and does not affect the driving connections presently described.

The upper end of the shaft 44 of feed wheel 43 carries a bevel pinion 53 which meshes with a bevel pinion 54 mounted to rotate on stud pin 47. A sprocket 55 compounded with the pinion 54 is connected by a chain 56 with a sprocket 57 carried by the main drive shaft 17. By means of this chain and the gearing described the two feed wheels are driven in opposite directions so as to positively eject each toplift supplied to the nip or bite of said wheels by the conveyor chain 32.

I will now describe the means for counting the toplifts as they are ejected by the feed wheels. A small vertical rock shaft 58 is mounted in a bearing bracket 59 and is provided with two arms 60 the outer ends of which, as best shown in Fig. 3, have rounded surfaces, said surfaces extending across the slight space between the two feed wheels, the arms 60 themselves being in the plane of the peripheral grooves of the feed wheels whereby said arms can be acted upon by passing toplifts so as to rock the shaft 58. A short arm 61 of the rock shaft has a tension spring 62 connected to a suitable fixed point so that said spring will exert a constant tendency to hold the rock shaft and its arm 60 in the position shown in Fig. 3. Another and longer arm 63 of the rock shaft 58 has a yoke-shaped outer end engaging an arm of a well-known form of counter 64, so that every time that a toplift passes the arm 60, the counter 64 will be actuated one step. The counter which may be of the "Veeder" type is carried by a suitable bracket 65.

As the toplifts are finally ejected past the counting mechanism they drop into a chute 66 which may deposit them into any suitable receptacle for shipment, it being understood, of course, that when the shipping receptacle is filled, due notice will be taken of the counter and a record made of the number of toplifts that have been passed into said shipping receptacle.

While the invention is particularly adapted for the counting of toplifts as hereinbefore explained, I do not limit myself thereto as other articles might be counted by means of the same or a mechanically similar machine.

Having described my invention, what I claim as new and desire to secure by Letters Patent of the United States is:

1. In a machine of the character described, the combination of a lift feeding mechanism having a restricted entrance opening of a size and shape to permit a lift to enter only in an edgewise direction, means for separating and transferring lifts from a promiscuous mass and a deflector arranged between the lift separating and transferring means and the lift feeding mechanism, to guide the lifts correctly into the feeding mechanism.

2. A machine for separating lifts from a promiscuously arranged mass and delivering them one at a time to a counter, comprising a hopper for containing a mass of unsorted lifts, a feeding mechanism having a restricted inlet opening less in width than the thickness of two lifts so arranged that lifts can enter it only in edge to edge relation, a mechanical separator constructed and arranged to separate and transfer lifts from the hopper, and a guide arranged to receive lifts from the separator and guide them to said inlet opening.

3. In a machine of the character described, the combination of a feeding mechanism having a restricted entrance opening slightly wider than the thickness of a lift, means separated from the feeding mechanism for guiding lifts to said entrance opening, and means for varying the relation between said guiding means and the feeding mechanism to adapt the machine to lifts of different thicknesses.

4. A machine for sorting and conveying lifts to a desired place, comprising means for separating and transferring lifts from a promiscuous mass, a deflecting member in lift receiving relation to said means, a lift feeding mechanism having a restricted inlet opening in receiving relation to the deflecting member, and means for varying the position of said inlet opening with respect to the deflecting member to operate on lifts of various dimensions.

5. A machine for sorting and conveying lifts to a desired place, comprising an adjustable feeder having a restricted inlet opening with beveled upper edges, an adjustable deflector for guiding lifts into said inlet opening and separate means for independently adjusting the feeder and the deflector, each with respect to the other.

In testimony whereof I have signed my name to this specification.

THOMAS LUND.